US010005353B2

(12) United States Patent
Holmes et al.

(10) Patent No.: US 10,005,353 B2
(45) Date of Patent: Jun. 26, 2018

(54) MOUNTING STRUCTURE FOR IN-TANK OIL COOLER AND RADIATOR

(71) Applicant: DENSO International America, Inc., Southfield, MI (US)

(72) Inventors: Mark Holmes, Troy, MI (US); Oguzhan Colpan, Waterford, MI (US)

(73) Assignee: DENSO International America, Inc., Southfield, MI (US)

( * ) Notice: Subject to any disclaimer, the term of this patent is extended or adjusted under 35 U.S.C. 154(b) by 658 days.

(21) Appl. No.: 14/526,984

(22) Filed: Oct. 29, 2014

(65) Prior Publication Data
US 2016/0121710 A1 May 5, 2016

(51) Int. Cl.
B60H 3/00 (2006.01)
B60K 11/04 (2006.01)

(52) U.S. Cl.
CPC .................... B60K 11/04 (2013.01)

(58) Field of Classification Search
CPC ............... B60K 11/04; F28F 3/00; F28F 3/02
USPC .......................................................... 165/44
See application file for complete search history.

(56) References Cited

U.S. PATENT DOCUMENTS

| 4,130,159 | A | * | 12/1978 | Ohta | B60K 11/04 123/41.54 |
| 4,227,570 | A | * | 10/1980 | Crews | F01P 11/08 165/140 |
| 4,903,760 | A | * | 2/1990 | Joshi | F01P 11/08 123/196 AB |
| 5,570,737 | A | * | 11/1996 | Tokutake | F28D 1/0535 165/67 |
| 5,711,370 | A | * | 1/1998 | Tanaka | F28F 9/002 165/153 |
| 5,937,938 | A | * | 8/1999 | Makino | F01P 11/08 165/140 |
| 6,082,449 | A | * | 7/2000 | Yamaguchi | F28D 9/0075 165/153 |
| 7,147,040 | B2 | * | 12/2006 | Calhoun | F28F 9/0234 165/78 |
| 7,260,893 | B2 | * | 8/2007 | Calhoun | F28F 9/0234 165/178 |
| 7,568,520 | B2 | * | 8/2009 | Ozawa | F28D 9/0043 138/89 |
| 7,992,622 | B2 | * | 8/2011 | Newman | F01P 11/08 165/140 |

(Continued)

FOREIGN PATENT DOCUMENTS

EP 0 932 011 4/2004
JP 11-142073 5/1999

(Continued)

Primary Examiner — Claire Rojohn, III
(74) Attorney, Agent, or Firm — Harness, Dickey & Pierce, P.L.C.; Michael J. Schmidt

(57) ABSTRACT

A radiator for a vehicle includes a built-in oil cooler tank. The radiator includes two header tanks and a core member disposed between the header tanks. One of the header tanks includes a support member disposed along an inner surface of the header tank and further defines an aperture. The oil cooler tank includes two ports and a core portion extending between the ports. Each of the ports has a rim and defines a bore. The rim of a given port is disposed within a given support member such that the bore of the given port aligns with a given aperture of the header tank.

2 Claims, 9 Drawing Sheets

(56) References Cited

U.S. PATENT DOCUMENTS

| | | | |
|---|---|---|---|
| 8,069,911 B2* | 12/2011 | Hori | F28F 9/0234 |
| | | | 165/137 |
| 2007/0272460 A1* | 11/2007 | Riniker | B60K 11/04 |
| | | | 180/68.4 |
| 2009/0159353 A1* | 6/2009 | Kerkewitz | B60K 11/04 |
| | | | 180/68.4 |
| 2012/0328390 A1* | 12/2012 | Colpan | F25B 39/04 |
| | | | 411/166 |

FOREIGN PATENT DOCUMENTS

| | | |
|---|---|---|
| KR | 10-2004-0075213 | 8/2004 |
| KR | 2009-0022726 | 3/2009 |
| KR | 10-2012-0129557 | 11/2012 |

* cited by examiner

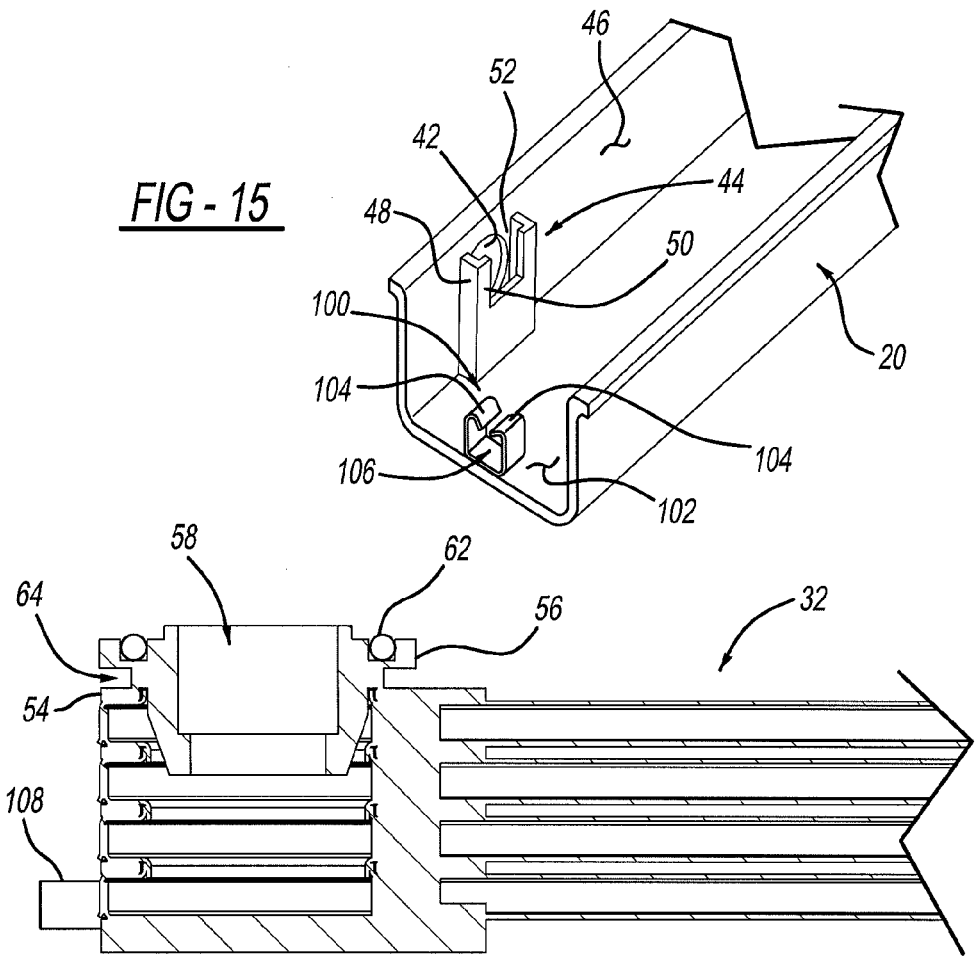
FIG - 15
FIG - 16
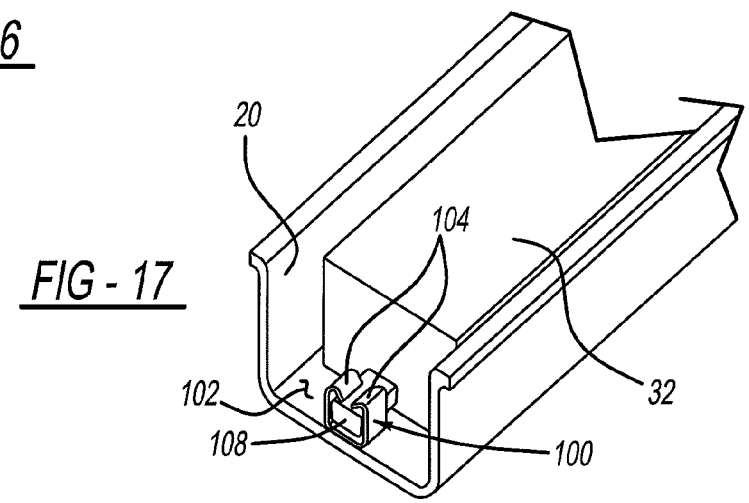
FIG - 17

MOUNTING STRUCTURE FOR IN-TANK OIL COOLER AND RADIATOR

FIELD

The present disclosure relates to a mounting structure for an in-tank cooler and radiator. More particularly, the present disclosure relates to a mounting structure for attaching an in-tank oil cooler to a radiator of a vehicle cooling system.

BACKGROUND

This section provides background information related to the present disclosure which is not necessarily prior art.

A heat exchanger, such as a radiator, is often used to cool coolant flowing through a vehicle engine. An oil cooler tank disposed within a header tank of the radiator is used to cool fluids such as oil flowing through the engine or automatic transmission fluid.

Threaded fittings are commonly used to attach the oil cooler tank to the header tank of the radiator. The threaded fittings engage with threads defined on an inner surface of an inlet port and an outlet port of the oil cooler tank. The threads defined on the fittings and the ports of the oil cooler tank require additional machining operations which increases the cost of the radiator. Furthermore, the interference between the oil cooler tank, the fittings, and the header tank is susceptible to various leak paths which allows the fluid flowing through the oil cooler tank to mix with the coolant being cooled by the radiator, or even, leak outside of the radiator. Thus, a more resilient and cost effective configuration for attaching the oil cooler tank to the radiator is needed.

SUMMARY

This section provides a general summary of the disclosure, and is not a comprehensive disclosure of its full scope or all of its features.

The present disclosure provides for a radiator having a built-in oil cooler tank for a vehicle engine cooling system. The radiator includes two header tanks and a core member disposed between the header tanks. One of the header tanks houses the oil cooler tank. Such header tank defines two apertures and includes two support members disposed on an inner surface of the header tank at the apertures. More particularly, a support member defines an opening that aligns with a given aperture.

The oil cooler tank includes two ports and a core portion disposed between the ports. Each of the ports define a bore and has a body and a rim extending from the body. A given port is received and attached to a given support member. Specifically, the rim of the given port is disposed within the opening defined by the support member such that a given aperture and the bore defined by the given port align with each other. Accordingly, the oil cooler tank is attached to the header tank via the support member and the port. Such configuration eliminates the need for additional machining typically required for threaded fittings, thereby reducing the cost of the radiator.

In an aspect of the present disclosure, each of the support members has a wall extending from the inner surface of the header tank and a shoulder perpendicularly extending from the wall. With the oil cooler tank attached to the header tank, the rim is disposed on the shoulder such that the shoulder is disposed between the rim and the body of the port of the oil cooler tank.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 15 is a perspective view of a snap-in connector provided on the header tank of the radiator as part of a snap-in feature;

FIG. 16 is a perspective view of a dowel protruding from an end of the oil cooler tank as part of the snap-in feature;

FIG. 17 is a perspective view of the header tank engaged with the oil cooler tank via the snap-connector and the dowel.

Corresponding reference numerals indicate corresponding parts throughout the several views of the drawings.

DETAILED DESCRIPTION

Figure 1:
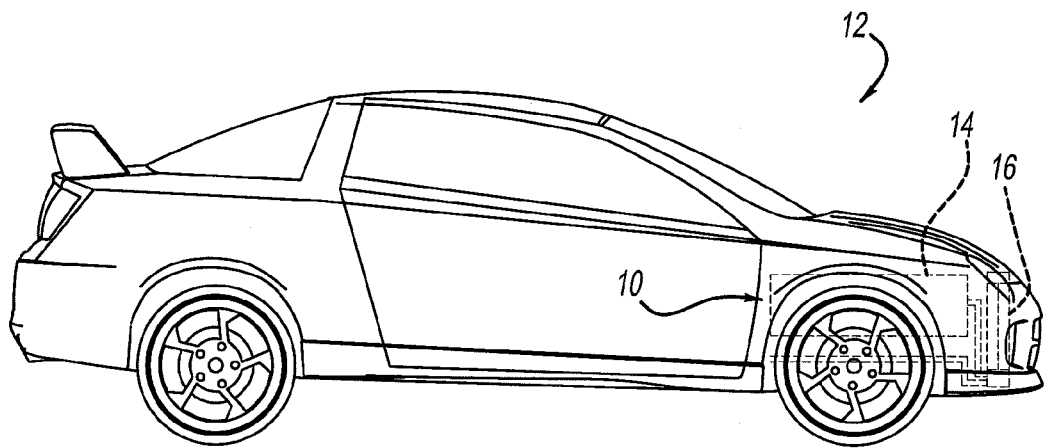
FIG. 1 illustrates a vehicle having a vehicle cooling system for cooling an engine disposed in the vehicle.

The present disclosure will now be described more fully with reference to the accompanying drawings. With reference to FIG. 1, a vehicle cooling system 10 for a vehicle 12 cools an engine 14 of vehicle 12. The vehicle cooling system 10 includes a radiator 16, which is a heat exchanger for cooling a coolant that flows through the engine 14.

Figure 2:
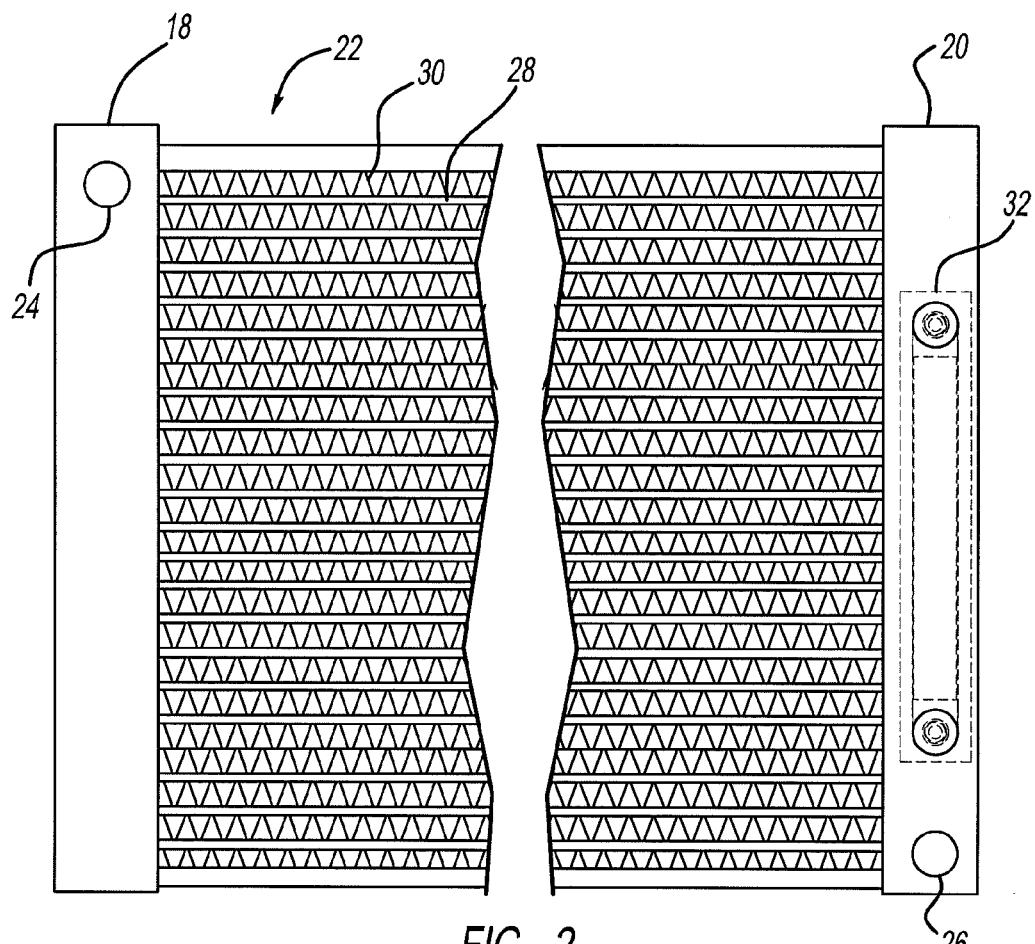
FIG. 2 is a perspective view of a radiator equipped with an oil cooler tank of the vehicle cooling system.

As shown in FIG. 2, the radiator 16 includes an inlet header tank 18, an outlet header tank 20, and a core member 22 disposed between the inlet header tank 18 and the outlet header tank 20. The inlet header tank 18 defines an inlet 24 and the outlet header tank 20 defines an outlet 26 through which the coolant enters and exits the radiator 16. The core member 22 includes a plurality of tubes 28 and a plurality of fins 30 which extend between the header tanks 18, 20. The tubes 28 and the fins 30 are arranged in parallel in an alternating pattern, such that adjacent tubes 28 are connected via a fin 30.

Coolant from the engine, which may either be a liquid or gaseous phase, flows from the inlet header tank 18, through the core member 22, and out the outlet header tank 20. The core member 22 cools the coolant flowing through the radiator 16. More particularly, coolant flows through the tubes 28, and the fins 30 conduct or transfer heat from the coolant flowing through the tubes 28. Heat transferred to the fins 30 is transferred to air flowing through the radiator 16.

Figure 3:
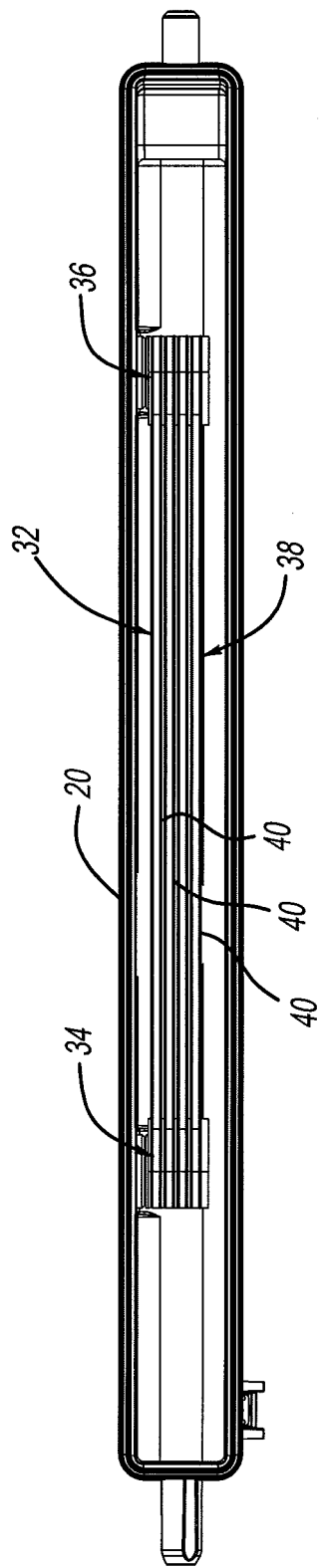
FIG. 3 is a perspective view of the oil cooler tank disposed in a header tank of the radiator.
Figure 4:
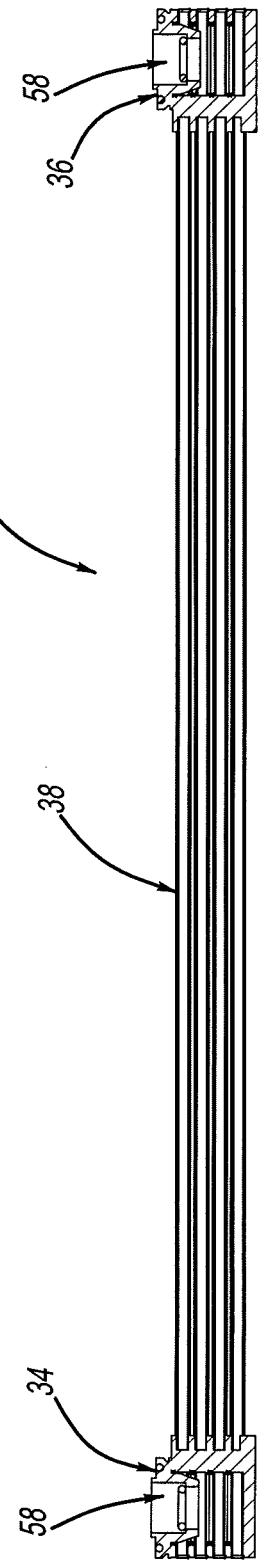
FIG. 4 is a cross-sectional view of the oil cooler tank.

The radiator 16 includes an oil cooler tank 32 disposed within the outlet header tank 20. Alternatively, the oil cooler tank 32 may also be disposed in the inlet header tank 18. As shown in FIG. 3, the oil cooler tank 32 includes an entry port 34, an exit port 36, and a core portion 38. The core portion 38 includes a plurality of flat tubes 40 that are in a stacked configuration, and are fluidly connected with each other and with the ports 34, 36.

The oil cooler tank 32 cools fluid, such as engine oil or automatic transmission fluid, by transferring heat from the fluid to the coolant flowing in the header tank 20. More particularly, fluid enters the oil cooler tank 32 via the entry port 34 and flows through the flat tubes 40 which absorb the heat of the fluid and transfers the heat to the coolant that is outside of the oil cooler tank 32. The fluid then flows out from the oil cooler tank 32 via the exit port 36. The fluid flowing through the oil cooler tank 32 is contained within the oil cooler tank 32, and is sealed from leaking into the header tank 20.

Figure 5:
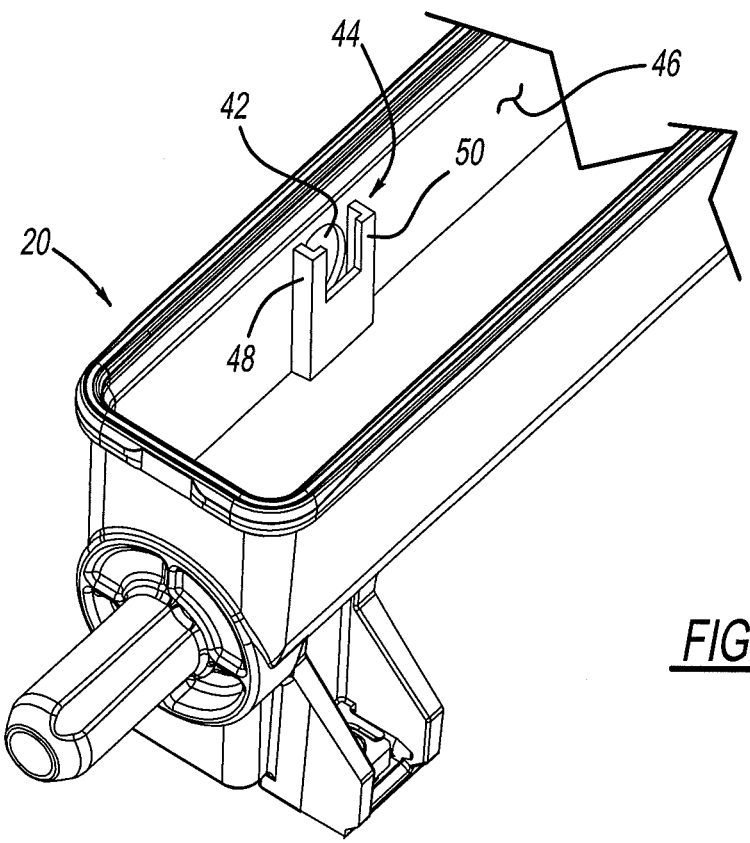
FIG. 5 is a partial perspective view of a header tank of the radiator having a support member.
Figure 6:
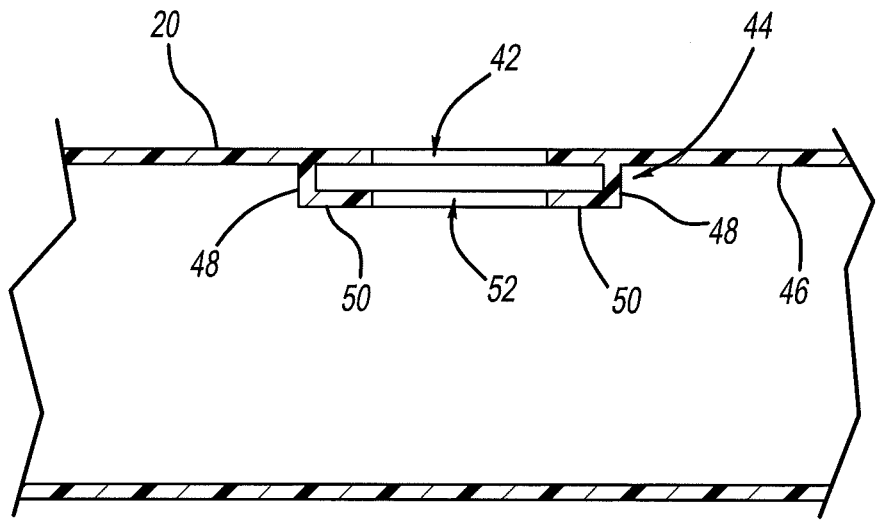
FIG. 6 is a cross-sectional view of the support member disposed in the header tank of the radiator.

Referring to FIGS. 5 and 6, the header tank 20 defines an aperture 42 which aligns with the port 34 of the oil cooler tank 32. The header tank 20 further includes a support member 44 disposed on an inner surface 46 of the header tank 20. While the figures only depict one aperture 42 and one support member 44, an aperture and a support member is provided for each of the ports 34, 36. Accordingly, in the following description, details regarding the aperture 42 and the support member 44 which interface with the port 34 are also applicable to the aperture and support member interfacing with the port 36.

The support member 44 includes a wall 48 and a shoulder 50 that forms a three-sided pocket or exterior. The support member 44 further defines an opening 52 for receiving and housing the port 34. The support member 44 is aligned around the aperture 42 such that the opening 52 is under the aperture 42, as shown in FIG. 6. The wall 48 extends from the inner surface 46 of the header tank 20, and the shoulder 50 extends from the wall 48 toward the opening 52. Accordingly, the support member 44 may be viewed as substantially having a "U" shaped configuration. The support member 44 may be a separate component that is fixed to the header tank 20 via welding, brazing, or other suitable fastening method.

Figure 7:
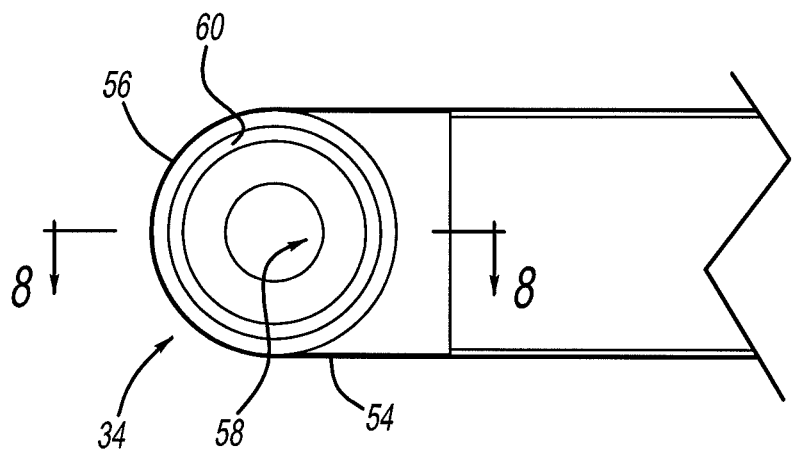
FIG. 7 is a top view of a port of the oil cooler tank in a first embodiment.
Figure 8:
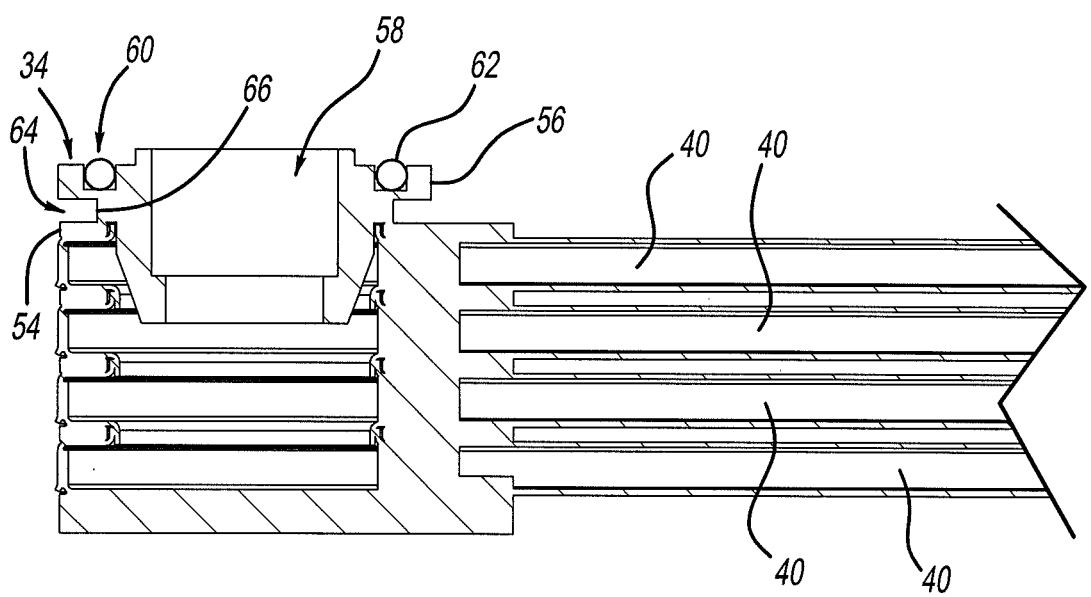
FIG. 8 is a cross-sectional view of the port of FIG. 7 along line 8-8.

Referring to FIGS. 7 and 8, the port 34 of the oil cooler tank 32 includes a body 54 that is integrated with one end of the flat tubes 40 and an annular rim 56 that extends from the body 54. The port 34 defines a bore 58 which extends from the annular rim 56 into the body 54. The rim 56 defines a seal cavity 60. An o-ring 62 sits in the seal cavity 60 to prevent fluid from leaking into the header tank 20. A groove 64 is defined between the body 54 and the rim 56 to form a neck 66 between the body 54 and the rim 56. The groove 64 may fully extend around the port 34 or may extend along portions of the port 34 that are to interface with the shoulder 50, as described below.

Figure 9:
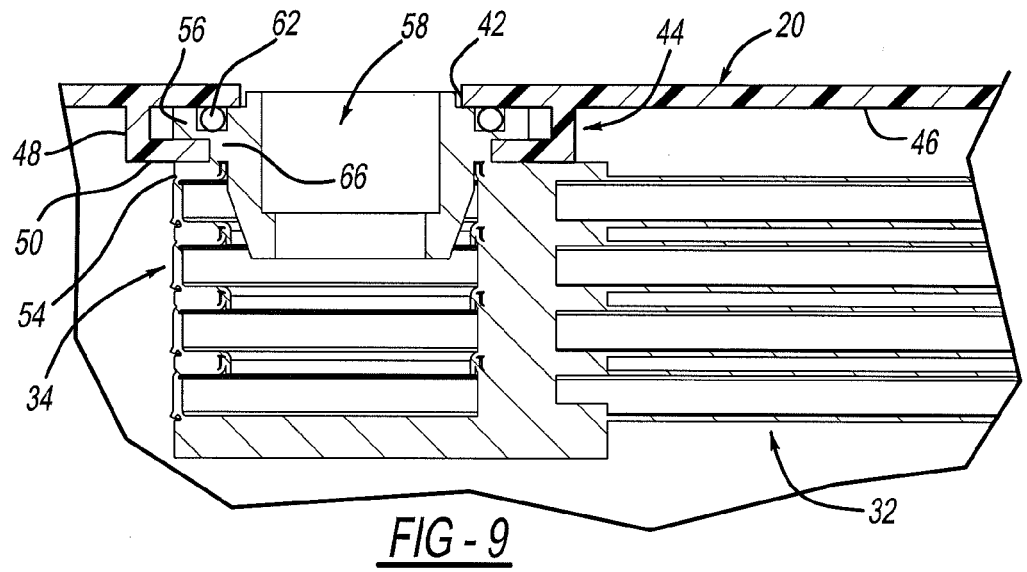
FIG. 9 is a cross-sectional view of the header tank engaged with the port of the oil cooler tank.

Referring to FIG. 9, the oil cooler tank 32 is attached to the header tank 20 by way of the support member 44 and the port 34. Specifically, the shoulder 50 of the support member 44 is positioned in the groove 64 such that the shoulder 50 of the support member 44 is disposed between the annular rim 56 and the body 54 of the port 34. The rim 56 of the port 34 is substantially housed within the opening 52 between the wall 48 and the shoulder 50 of the support member 44. The port 34 abuts with the inner surface 46 of the header tank 20, and the o-ring 62 seals the interface between the header tank 20 and the oil cooler tank 32 to prevent fluid flowing through the oil cooler tank 32 from leaking into the header tank 20. The bore 58 of the port 34 aligns with the aperture 42 of the header tank 20.

The oil cooler tank 32 can be attached to the radiator 16 by aligning and positioning the ports 34, 36 of the oil cooler tank 32 into the support members 44 provided in the header tank 20, such that the support member 44 engages within the groove 64 and the bore 58 aligns with the aperture 42. Such configuration eliminates the need of threaded ports which requires secondary machining, and, therefore, reduces the cost of the radiator 16 having the built in oil cooler tank 32.

Figure 10:
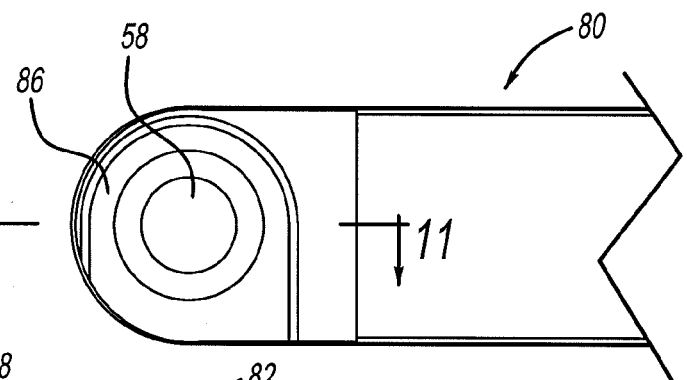
FIG. 10 is a top view of a port of an oil cooler tank in a second embodiment.
Figure 11:
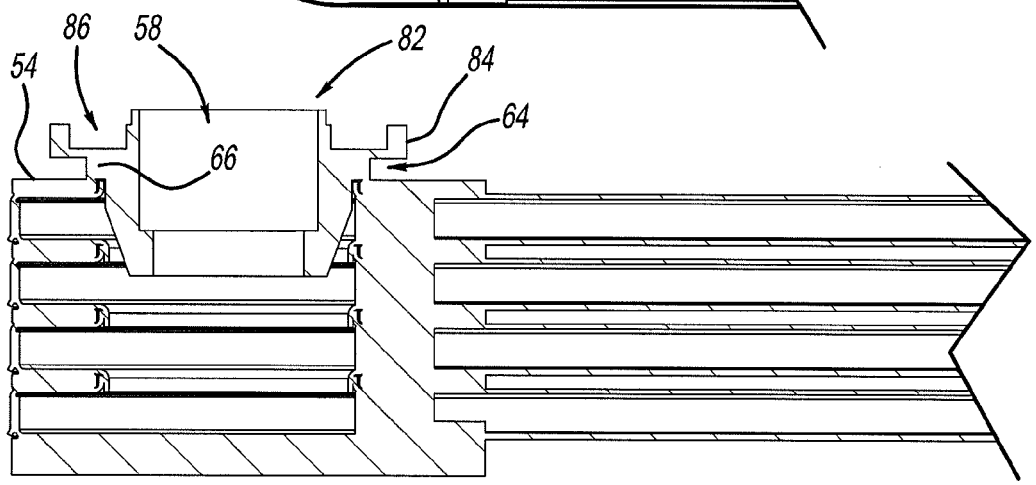
FIG. 11 is a cross-sectional view of the port of FIG. 10 along line 11-11.

To ensure that the oil cooler tank 32 remains attached to the header tank 20, a gasket may be used to close the side of the support member 44 that receives the port 34. More particularly, referring to FIGS. 10 and 11, an oil cooler tank 80 in a second embodiment is presented. The oil cooler tank 80 is substantially similar to the oil cooler tank 32. A port 82 of the oil cooler tank 80 includes an annular rim 84 which extends from the body 54. The annular rim 84 defines a gasket cavity 86.

Figure 12:
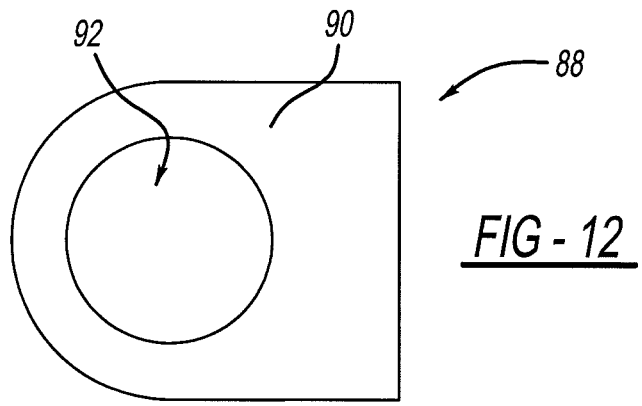
FIG. 12 is a perspective view of a gasket for the port of FIG. 10.
Figure 13:
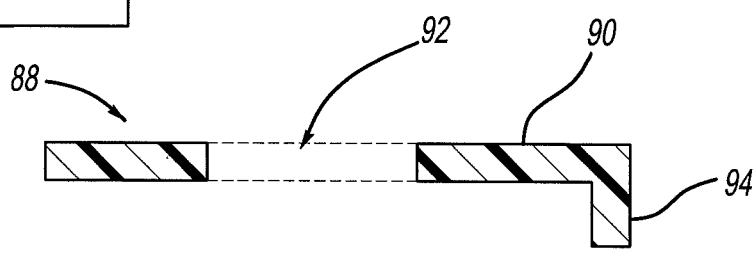
FIG. 13 is a cross-sectional view of the gasket.
Figure 14:
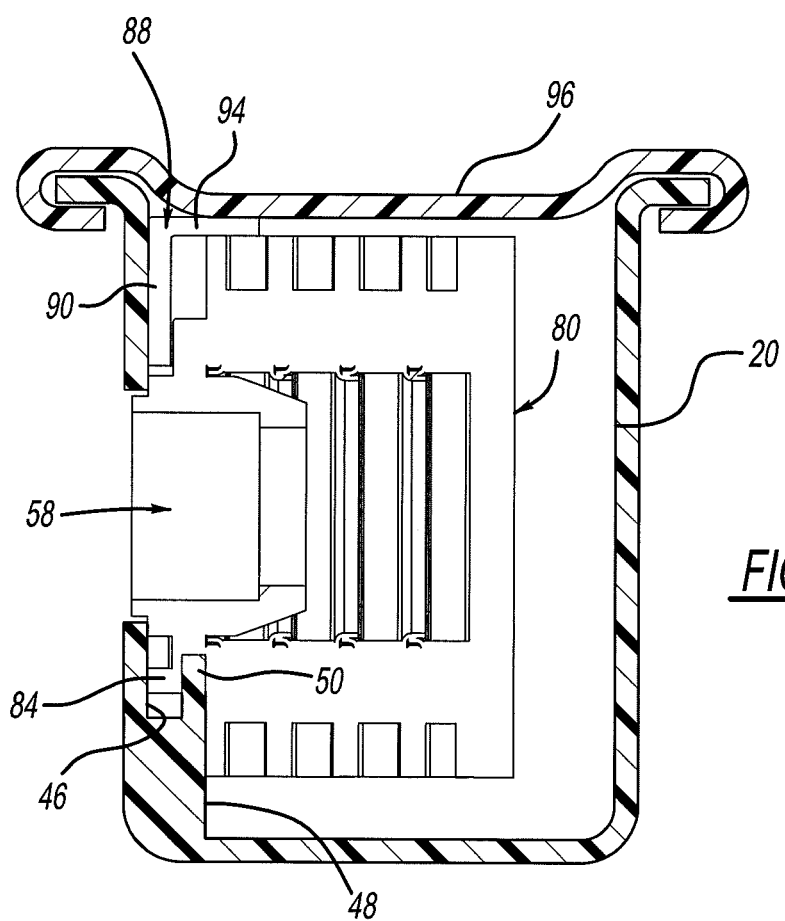
FIG. 14 is a cross-sectional view of the header tank engaged with the port of the oil cooler tank that includes the gasket.

Referring to FIGS. 12-14, a gasket 88 includes a semi-annular portion 90 that defines a hole 92 and includes a stop member 94 extending perpendicularly from the semi-annular portion 90. The semi-annular portion 90 sits in the gasket cavity 86. The area of the semi-annular portion 90 that is closest to the stop member 94 extends past the rim 84 of the port 82.

When the oil cooler tank 80 is disposed within the header tank 20, the rim 84 and the gasket 88 abut with the inner surface 46 of the header tank 20. The shoulder 50 of the support member 44 is disposed within the groove 64 between the rim 84 and the body 54. The stop member 94 of the gasket 88 forms a fourth side of the support member 44 by covering the side of the support member 44 through which the port 82 is received. A core plate 96 which is fixedly attached to the header tank 20 exerts a compressive force onto the gasket 88. Specifically, the stop member 94 is compressed between the oil cooler tank 80 and the core plate 96.

The gasket 88 replaces the o-ring 62, and forms a seal between the header tank 20 and the port 82 of the oil cooler tank 80 to prevent fluid from leaking into the header tank 20. The gasket 88 further secures the oil cooler tank 80 to the header tank 20 by forming the fourth wall of the support members 44, or, in other words, closing the opening 52, thereby minimizing or preventing the oil cooler tank 80 from moving within or out of the support members 44.

The oil cooler tank may also be retained via a snap-in feature. More particularly, referring to FIGS. 15-17, the header tank 20 may include a snap-in connector 100. The snap-in connector 100 is disposed on an inner base surface 102 adjacent to the inner surface 46 having the support member 44. The snap-in connector 100 has two hook members 104 that define a gap 106.

The oil cooler tank 32 includes a dowel 108 that extends from a side of the port 34 which is opposite of the flat tubes 40. The dowel 108 snaps into the snap-in connector 100, and is held in the gap 106. More particularly, during installation of the oil cooler tank 32, the dowel 108 exerts a force on to the hooks 104 to move the ends of the hooks 104 until the dowel 108 snaps in and is positioned in the gap 106. Once the dowel 108 is disposed in the gap 106, the hooks 104 exert a force on to the dowel 108 to retain the dowel 108 in the gap 106. The snap-in feature secures the position of the oil cooler tank 32 to minimize or prevent the oil cooler tank 32 from shifting or moving within the header tank 20.

In the example embodiment, the snap-in feature provided by the snap-in connector 100 and dowel 108 is provided with the oil cooler tank 32 having the o-ring 62. Alternatively, the snap in feature may be used with the oil cooler tank 80 configured to include the gasket 88. Furthermore, while the figures depict the use of one snap-in feature, two snap-in features (i.e., snap-in connector and dowel) may be disposed on opposite ends of the header tank 20 and oil cooler tank 32 to secure both ends of the oil cooler tank 32 to the header tank 20.

Figure 18:
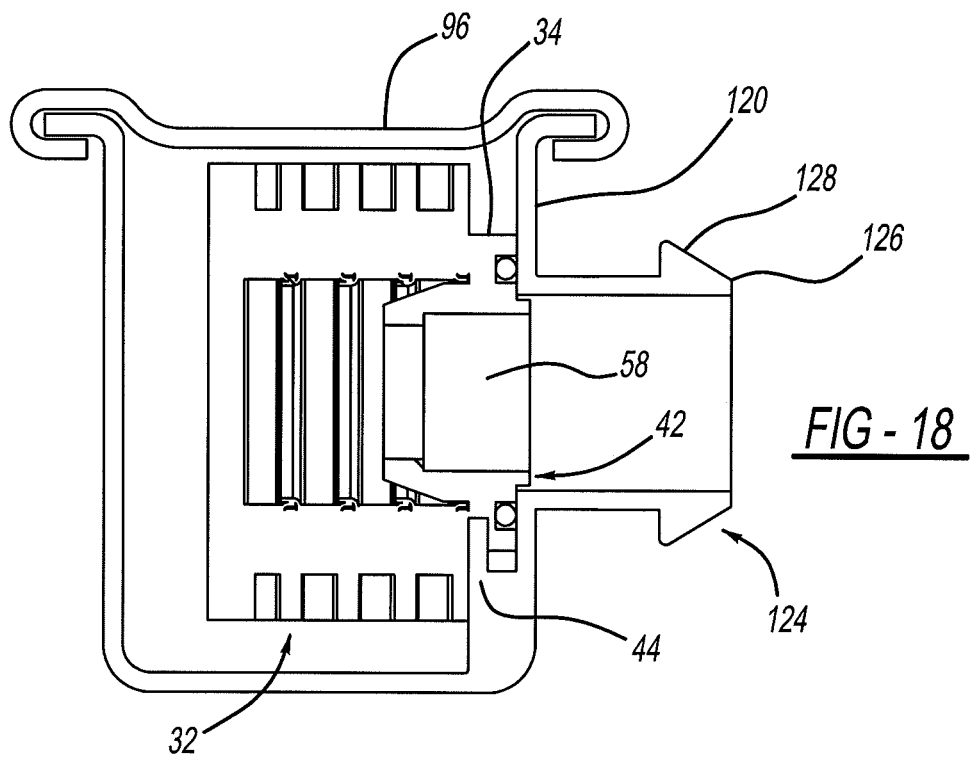
FIGS. 18, 19, and 20 illustrate a header tank having a spout for receiving a hose line.
Figure 19:
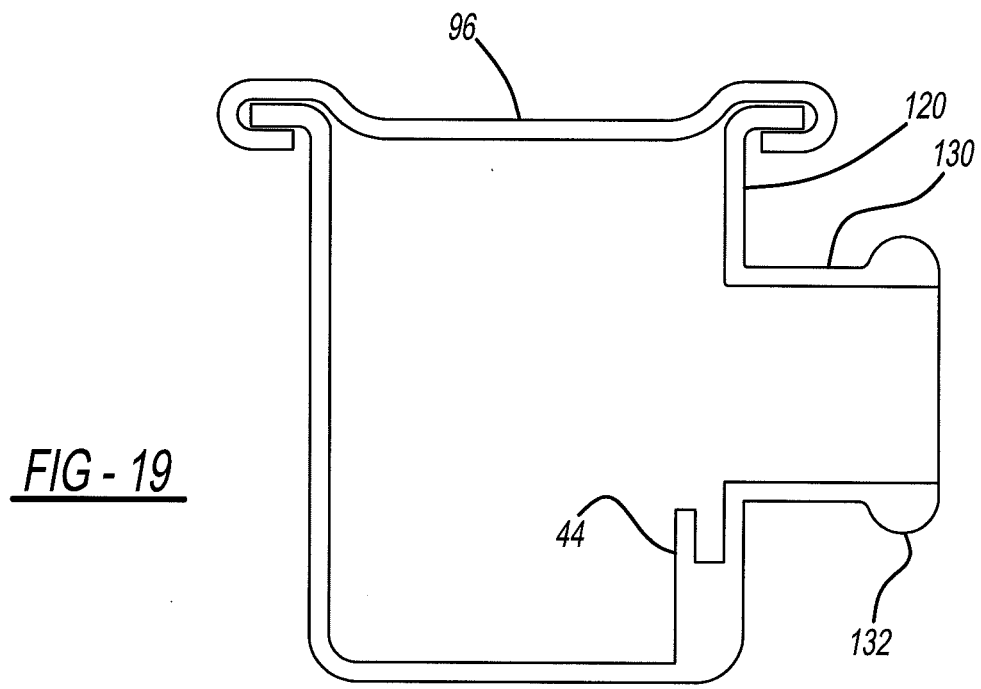
Figure 20:
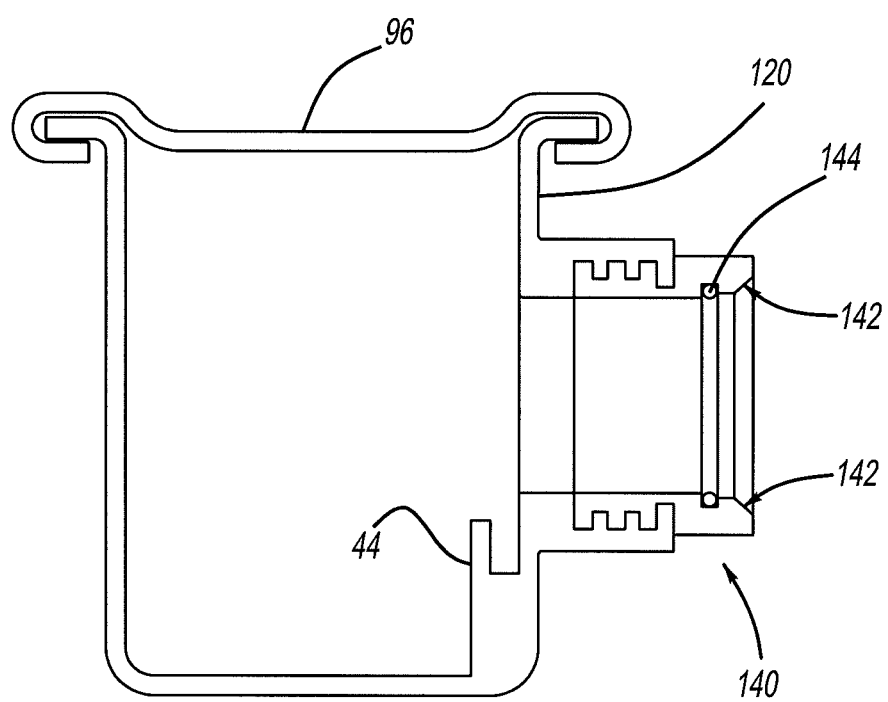

The oil cooler tank 32 receives the fluid via a hose (not shown) which transfers fluid between the oil cooler tank 32 and, for example, the engine 14. In the example embodiment, the port 34 does not include threads for coupling the oil cooler tank 32 to the header tank 20 and to a spout which couples to the hose. In lieu of the threaded spout, the header tank 20 may include a spout which connects to the hose via a quick-connect configuration. More particularly, FIGS. 18-20 depict a header tank 120 that has a spout. The header tank 120 is substantially similar to header tank 20 and includes the support member 44 for both ports 34, 36. Although not shown, the header tank 120 includes a spout for each port 34, 36 of the oil cooler tank 32.

Referring to FIG. 18, the header tank 120 includes a spout 124. The spout 124 extends from the aperture 42 which aligns with the bore 58 of the port 34. The outer diameter of the spout 124 forms a stop face 126 and a tapered head 128 which extends from the stop face 126. The hose has a nozzle that connects around the outer diameter of the spout 124, such that the hose is provided as the female connector and the spout 124 is the male connector. The nozzle of the hose slides over the tapered head 128 and is retained by the stop face 126.

Referring to FIGS. 19 and 20, the spout of the header tank 120 may be configured in various suitable ways to form the quick connection with the hose. For example, the header tank 120 may include a spout 130 which has a rounded head 132 (FIG. 19). Alternatively, the spout may be configured as the female connector and the hose may be the male connector. For example, in FIG. 20, the tank 120 may include a spout 140 which defines a chamfered opening 142 for receiving the nozzle of the hose. The spout 140 may also include an o-ring 144 which prevents the fluid from leaking from the spout 140.

The spout fluidly couples the hose to the oil cooler tank 32 disposed within the header tank 120. Such configuration utilizes quick-connect fastening mechanism which are inexpensive compared to threaded fittings.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features elements, and/or components, but do not preclude the presence or addition of one or more other features, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A radiator for a vehicle comprising:
  a first header tank and a second header tank, the first header tank including two support members disposed along an inner surface of the first header tank, and the first header tank defining two apertures, wherein the support members have a shoulder extending along an axis parallel with the inner surface of the first header tank;
  a core member disposed between the first header tank and the second header tank; and
  an oil cooler tank disposed in the first header tank, the oil cooler tank including two ports and a core portion disposed between the two ports, wherein
  each of the ports has a body, a neck extending from the body, a groove defined at the neck such that the groove has two sidewalls and one bottom wall located on the neck, and a rim that extends from the neck, and each of the ports define a bore that fluidly couples the ports and the core portion, and
  with the oil cooler tank coupled to first header tank, the rim of a given port is disposed within a given support member and the shoulder of the given support member is disposed within the groove between the body and the rim of the given port, the shoulder is between the two sidewalls of the groove and in contact with the body, such that the bore of the given port aligns with a given aperture.

2. The radiator of claim 1 wherein the support members have a "U" shape exterior.

* * * * *